W. SCHRAMM.
CALIPERS.
APPLICATION FILED JULY 2, 1914.
1,145,852.
Patented July 6, 1915.
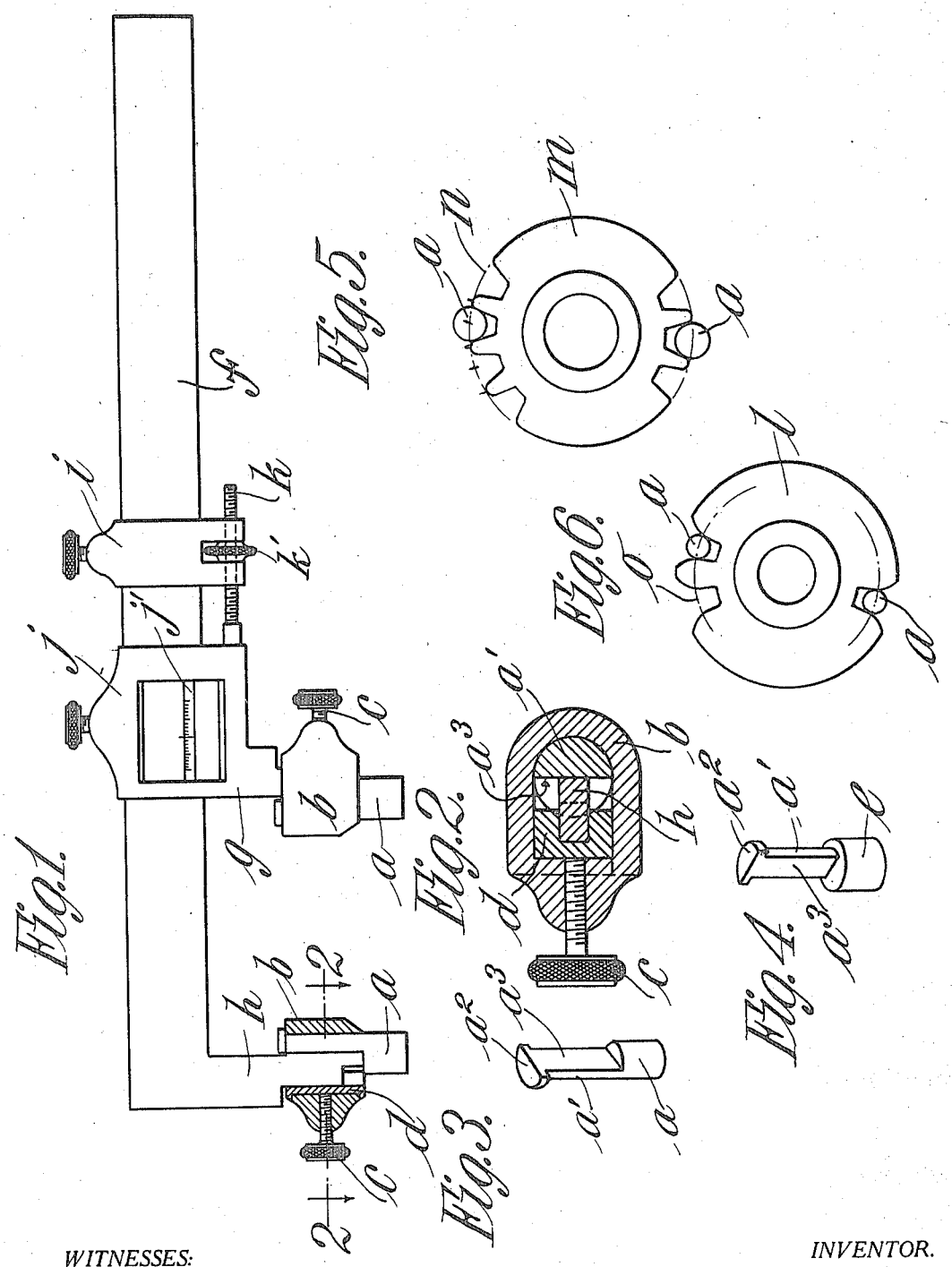
WITNESSES:
F. E. Hartwell.
Edith M. Potter
INVENTOR.
William Schramm.
BY
Chapin & Co.
ATTORNEY.

UNITED STATES PATENT OFFICE.

WILLIAM SCHRAMM, OF HARTFORD, CONNECTICUT, ASSIGNOR TO WHITNEY MANUFACTURING COMPANY, OF HARTFORD, CONNECTICUT, A CORPORATION OF CONNECTICUT.

CALIPERS.

1,145,852.  Specification of Letters Patent.  Patented July 6, 1915.

Application filed July 2, 1914. Serial No. 848,563.

*To all whom it may concern:*

Be it known that I, WILLIAM SCHRAMM, a citizen of the United States of America, residing at Hartford, in the county of Hartford and State of Connecticut, have invented certain new and useful Improvements in Calipers, of which the following is a specification.

This invention relates generally to measuring instruments.

More specifically, it pertains to novel and improved instruments for measuring the pitch diameter of sprocket wheels, gears, screw threads, and the like.

An object of the invention is to provide an instrument, preferably operating on the caliper principle, which is adapted to measure the pitch diameter of a sprocket wheel, gear, or the like independently from, and without reference to, the outside diameter.

Another object is to provide an instrument of the class described which is suitably arranged for rapid and convenient checking of pitch diameters of gear and sprocket wheels. Thus, assuming that a large number of gears of a given size and pitch are to be checked, the instrument is set to the correct pitch diameter; then, the caliper is applied to each gear in turn, the necessary adjustment of the distance between the measuring legs being made by a vernier operating screw, and the variation over or under the correct size may be read directly from the vernier scale.

Heretofore, so far as I am aware, there has been no instrument for calipering the pitch diameter of gears and sprocket wheels. Moreover, in the manufacture of gears, the present practice is to work from the outside diameter of the gear blank. For example, the blank is turned accurately to size after which the gear cutter is applied to mill each tooth. The cutter is sunk into the blank until a shoulder on the cutter strikes the periphery of the blank when the tooth has been cut to the correct depth. Naturally, an error in the outside diameter means an error in pitch diameter when gears are cut in this manner. Where gears or sprocket wheels are to be cut for accurate speed ratios, it is especially important to have the pitch-lines of precisely the correct diameter. Furthermore, since the speed ratios of a pair of gears depend directly upon their pitch diameters, the pitch diameter and not the outside diameter is the proper basis of measurement to employ.

The lack of accurate means to measure the pitch diameter of gears and sprockets is generally admitted. I have, by my invention, provided accurate means whereby the measurement of the pitch diameter independently and without regard to the outside diameter, heretofore impossible may be attained.

In general, my device is similar in its principle of measurement to the ordinary vernier caliper. However, the calipers of this type, as constructed at present, obviously cannot be applied to measure the pitch diameter of a gear. To provide means whereby this measurement may be conveniently attained, I make use of cylindrical plugs and means to attach the same to the legs of the caliper. These plugs are so secured to the caliper legs that the central axis of the plug coincides with the measuring surface of the caliper leg. The plugs are accurately ground in various sizes to accommodate the various pitches and tooth outlines used. Furthermore, they are so formed that, when the circumferential surface of the plug engages with the sides of adjacent teeth of correct form, the center of the plug lies exactly on the pitch line of the gear or sprocket. Thus, when a pair of these plugs is secured to the legs of the caliper and inserted between opposite pairs of adjacent teeth of a gear, the measurement indicated on the caliper scale is the pitch diameter.

A preferred embodiment of my invention is illustrated in the accompanying drawings, in which—

Figure 1 is an elevational view, partly in section of my measuring instrument. Fig. 2 is a sectional plan view taken on the line 2—2 of Fig. 1 and looking in the direction of the arrows. Fig. 3 and Fig. 4 are perspective views illustrative of the measuring plugs. Fig. 5 illustrates the manner in which my measuring instrument is applied to measure the pitch line of a "silent" chain sprocket. Fig. 6 illustrates the manner in which my measuring instrument is applied to measure the pitch line of a gear.

Referring to the drawings, $f$ is the slide bar of an ordinary vernier caliper. The fixed leg of the caliper is indicated at $h$, and $g$ is the movable leg which is provided with a yoke $j$. The latter embraces the slide bar $f$ and is provided with a vernier scale $j'$. The usual clamp is designated by $i$ and is connected in the ordinary way to the member $j$ by means of the threaded rod $k$ and thumb-nut $k'$.

Mounted on each of the legs $g$ and $h$ are measuring plugs. These plugs comprise a lower cylindrical portion $a$ and an upper semi-cylindrical portion $a'$ formed by cutting away a portion of the plug on its center line. The upper extremity of the plug $a$ is, furthermore, provided with a semi-cylindrical flange $a^2$. These plugs $a$ are secured to the caliper legs $g$ and $h$ by a yoke $b$ which encircles the plug $a$, the flange $a^2$ bearing upon the upper surface of the yoke $b$. Within the yoke is a slidable member $d$, channel-shaped in cross-section as clearly shown in Fig. 2. The member $d$ is designed to engage and clamp the plug $a$ against the caliper legs $g$ and $h$ by means of the knurled screw $c$.

It is to be noted particularly that the surface $a^3$ is centrally disposed relatively to the cylindrical plug $a$ and that this surface is clamped against the measuring surface of the caliper legs $g$ and $h$. Hence, the measurement indicated on the scale $j'$ is the distance between the centers of the two plugs $a$.

Fig. 3 clearly shows in perspective one of the plugs $a$. Another plug, designed for a different pitch than the plug $a$, is shown in Fig. 4. The lower portion $e$ is enlarged; the upper portions $a'$ and $a^2$ remain, however, of the same size and shape, shown in Fig. 3. In practice, for a sprocket having a certain tooth outline, I provide a set of these plugs, the lower portions of which vary in diameter according to the pitch of the sprocket which is to be measured. Similarly, a different set may be provided for gears having a certain tooth outline, and a set may also be provided for screw threads. In all cases, the plug is accurately ground to such a diameter that, when the plug is inserted in the space between adjacent teeth of the proper pitch and when the circumferential surface of the plug is in contact with the teeth, the central axis of the plugs lies on the pitch line. Thus, in Fig. 5, a pair of plugs $a$ is inserted in the space between opposite pairs of adjacent teeth of a "silent" chain sprocket $m$. The center of each plug will be seen to lie on the line $n$ which is the pitch line of a sprocket of this type. Fig. 6 shows the plug $a$ applied to a gear $l$, and the diameter of these plugs is such that their centers lie exactly on the pitch line $o$.

After a set of plugs, properly graduated in size to accommodate the various pitches of gears and sprockets, has been provided, it is extremely simple to measure the pitch diameter. The plugs are inserted as indicated in Figs. 5 and 6 and adjusted until each plug comes in contact with a pair of teeth. The measurement then indicated on the bar $f$ is the true pitch diameter. If rapid checking to determine the limit of error of a lot of gears of equal diameter and pitch is desired, the member $i$ is clamped to the slide bar $f$ in such a way that the zero mark on the scale $j'$ of the head $j$ coincides with the required diameter, as indicated on the bar $f$. The caliper may then be applied to each gear in turn, and the slight variation in the distance between the plugs $a$ may be adjusted by the screw $k$ and thumb-nut. The amount of error will then be indicated by the deviation of the zero mark on the scale $j'$ from its original position.

The foregoing structure will be seen to be suitable for measuring gears or sprockets which have an even number of teeth. Obviously, the instrument, when applied to a sprocket of an odd number of teeth, cannot be inserted in the space between opposite pairs of adjacent teeth. In such cases, a tooth is directly opposite a space, and I apply the plugs in a pair of spaces which are most nearly opposite. This measurement is then corrected by applying a factor from a computed table to obtain the true measurement. Thus, I have provided simple means for measuring accurately and conveniently and rapidly the pitch diameter of a sprocket, gear, or screw-thread. It is recognized that many changes and modifications may be made in the structure herein disclosed without departing from the scope of my invention which is more truly defined in the appended claims.

What I claim is—

1. A measuring instrument, comprising, in combination, a vernier caliper having measuring legs, cylindrical plugs adapted to be inserted in the spaces between opposite pairs of adjacent teeth of a gear or sprocket wheel of a given pitch, said plugs being of such diameter that, when so positioned, their central axes lie on the pitch line of said gear or sprocket wheel, and means to attach said plugs to said legs, so that the central axes of said plugs are coincidental with the contacting surfaces of said legs.

2. A measuring instrument, comprising, in combination, a vernier caliper having measuring legs, cylindrical plugs adapted to be inserted in the spaces between opposed pairs of adjacent gear or sprocket teeth of a certain pitch, said plugs being of such diameter that when the circumferential surfaces thereof engage with said teeth, their centers lie on the true pitch circle of said gear or sprocket, and means to attach said plugs to said legs so that the central axes of said plugs coincide with the contacting surfaces of said legs.

3. A measuring instrument, comprising in combination, a vernier caliper having measuring legs, cylindrical plugs, adapted to be inserted in the spaces between adjacent teeth of a gear, sprocket or screw-thread of a given pitch, said plugs being of such diameter that, when positioned therein so that the circumferential surfaces of the plugs contact with said teeth, their central axes lie on the pitch line of said gear-sprocket, or screw-thread, and a yoke adapted to secure said plugs to said legs so that the central axes of said plugs is coincidental with the contacting surfaces of said legs.

WILLIAM SCHRAMM.

Witnesses:
 Jas. W. Green,
 A. L. Brown.